United States Patent
Watson

(10) Patent No.: US 7,451,018 B2
(45) Date of Patent: Nov. 11, 2008

(54) SYSTEM AND APPARATUS FOR DETECTING AND MONITORING CIRCUIT BREAKER OPERATION

(75) Inventor: Robert Watson, Lisburn (GB)

(73) Assignee: Kelman Limited, Lisburn (GB)

( * ) Notice: Subject to any disclaimer, the term of this patent is extended or adjusted under 35 U.S.C. 154(b) by 204 days.

(21) Appl. No.: 10/961,722

(22) Filed: Oct. 8, 2004

(65) Prior Publication Data
US 2005/0267643 A1    Dec. 1, 2005

(30) Foreign Application Priority Data
Oct. 9, 2003    (GB) ................. 0323645.2

(51) Int. Cl.
G05B 11/01  (2006.01)
G06F 19/00  (2006.01)
G08B 21/00  (2006.01)

(52) U.S. Cl. .............. 700/292; 700/22; 702/59; 702/62; 340/639

(58) Field of Classification Search ............ 700/22, 700/286, 292–294; 702/57–66, 78, 79; 340/635, 340/638, 639, 657–664; 335/17
See application file for complete search history.

(56) References Cited

U.S. PATENT DOCUMENTS 4,556,882 A  * 12/1985 Brifman et al. ............ 340/3.44
5,061,922 A  * 10/1991 Nishijima et al. ......... 340/825.52
6,195,243 B1 *  2/2001 Spencer et al. ................ 361/64

FOREIGN PATENT DOCUMENTS

EP    0197835    * 10/1986

OTHER PUBLICATIONS

Epoline Register Plus, File EP1523080 [online], [retrieved on Oct. 28, 2006]. Retrieved from the Internet <URL: http://www.epoline.org/portal/public/!ut/p/kcxml/04_Sj9SPykssy0xPLMnMz0vM0Y_QjzKLN4i3dAfJgFjGpvqRqCKOcAFfj_zcVKBwpDmQ726kH6lf6aTvrRgX5AbGIFuaOEIAOZgaSM!/ delta/ base64xml/L0IDVE83b0pKN3VhQ1NZWW9LVVFvS1VRIS9ZQVVJQUFJSUlJSUlJTU1JSUlNSUlDQ0ILQ0>.*

* cited by examiner

*Primary Examiner*—Sean P Shechtman
(74) *Attorney, Agent, or Firm*—Van Dyke, Gardner, Linn & Burkhart, LLP

(57) ABSTRACT

A control apparatus for a plurality of devices, especially circuit breakers. The control apparatus includes activation circuitry for each device, and a power supply for supplying electrical power to the activation circuitry. The control apparatus adds a respective electrical signature component to the supplied electrical power upon detection that a respective device has operated. The signature components allow analysis equipment to determine which device has operated by analysing the supplied electrical power.

19 Claims, 3 Drawing Sheets

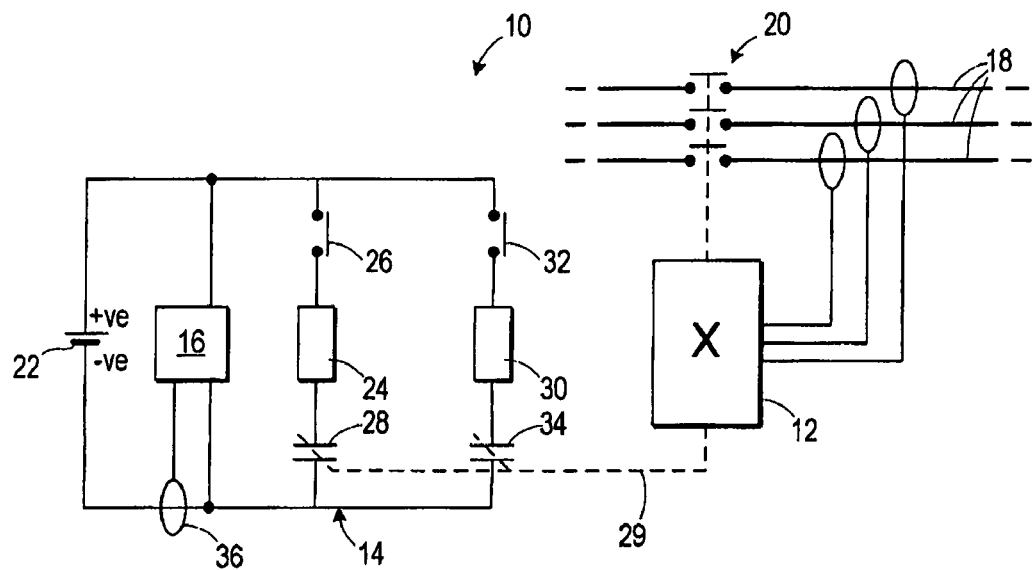
Fig. 1 - Prior Art
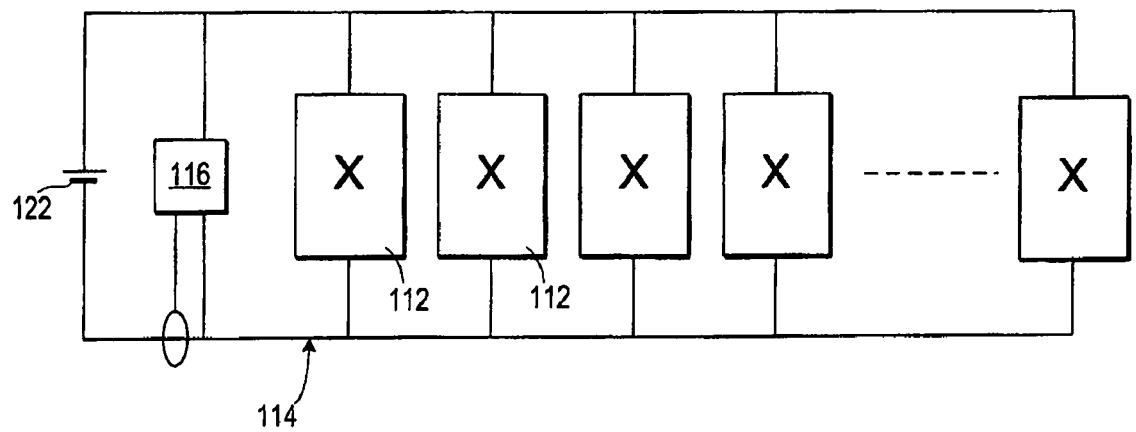
Fig. 2 - Prior Art

SYSTEM AND APPARATUS FOR DETECTING AND MONITORING CIRCUIT BREAKER OPERATION

FIELD OF THE INVENTION

The present invention relates to a system and an apparatus for detecting and monitoring the operation of, especially but not exclusively, circuit breakers.

BACKGROUND TO THE INVENTION

Many circuit breakers are operable by a trip coil which, when activated, are energised by a DC voltage supply, typically a battery. It is known to monitor the operation and performance of such circuit breakers by analysing the current which flows through the trip coil when energised. The PROFILE (trade mark) range of products supplied by Kelman Limited of Lissue Road, Lisburn, Northern Ireland, United Kingdom, exemplify circuit breaker analysers of this type.

Usually, a given site, for example an electricity distribution sub-station, has many circuit breakers that require monitoring. It is cost prohibitive and can be technically difficult to install a separate monitoring system at each circuit breaker. Typically, the respective trip coil for each circuit breaker is connected in parallel with a common DC voltage supply and a single circuit breaker analyser is provided for measuring the current at the DC voltage supply.

A problem with this arrangement is that the analyser needs to know which circuit breaker(s) has operated at any given time. Conventionally, this requires a respective electrical connection between each circuit breaker (or an associated component) and the analyser. This is considered to be relatively expensive and can be technically difficult to implement.

SUMMARY OF THE INVENTION

A first aspect of the invention provides a control apparatus for a plurality of devices, the control apparatus including means for activating each device, and a power supply for supplying electrical power to the activation means, wherein the control apparatus further includes means for detecting operation of each device and means for adding a respective signature component to the supplied electrical power upon detection that a respective device has operated.

Typically, respective activation means, detection means and signature component adding means are provided for each device.

Conveniently, said signature component is added to the electrical power supplied to the activation means.

Typically, the electrical power supply comprises a DC electrical power supply. Each device under the control of the control apparatus may comprise a circuit breaker. However, the invention may alternatively be used with other devices, especially switching devices.

In the preferred embodiment, each signature component comprises an electrical signal. Preferably, each signature component comprises one or more voltage signals added to the supply voltage. More preferably, each signature component comprises one or more voltage pulses. Alternatively, each signature component is created by causing variations in the current provided by the electrical power supply.

Preferably, each signature component comprises a respective binary code embodied in one or more voltage signals or pulses or current variations.

It is preferred that the respective signature component for each circuit breaker (or other device) is added to the electrical power supply after a respective time delay has elapsed after the respective circuit breaker, or other device, has operated.

In a preferred embodiment, said detection means comprises a detection apparatus associated with the respective activation circuitry and arranged to detect operation of the respective circuit breaker (or other device) by monitoring one or more electrical signals in the activation circuitry. Typically, the activation circuitry includes a respective trip coil and the detection apparatus is arranged to determine that the respective circuit breaker (or other device) has operated when the associated trip coil is energised.

In one embodiment, the means for adding a respective signature component to the supplied electrical power includes a pulse transformer arranged to add one or more voltage pulses to the supply voltage. Alternatively, the means for adding a respective signature component to the supplied electrical power may include a load selectably coupled to the electrical power supply by means of a switching device.

In a preferred embodiment, the detection apparatus is arranged to monitor the electrical current carried by the electrical supply lines which the respective circuit breaker is arranged to interrupt, and to cause a respective status code component to be added to said supplied electrical power depending on whether or not said main supply lines are live when interrupted by the respective circuit breaker.

A second aspect of the invention provides a detection apparatus for use in a control apparatus of the first aspect of the invention, the apparatus comprising means for detecting operation of each device, especially a circuit breaker, and means for adding a respective signature component to the supplied electrical power upon detection that a respective device has operated.

A third aspect of the invention provides a system for monitoring the operation of a plurality of circuit breakers, the system comprising the control apparatus of the first aspect of the invention and a circuit breaker analyser electrically coupled and/or electrically connected to the control apparatus, the circuit breaker analyser being arranged to detect signature components added to the supplied electrical power in the control apparatus.

A fourth aspect of the invention provides a circuit breaker analyser for use with the control apparatus of the first aspect of the invention, the circuit breaker analyser being arranged to detect signature components added to the supplied electrical power in the control apparatus.

A fifth aspect of the invention provides a method of signalling device operation in the control apparatus of the first aspect of the invention, the method comprising adding a respective signature component to the supplied electrical power upon detection that an associated device has operated.

Further advantageous aspects of the invention will become apparent to those ordinarily skilled in the art upon review of the following description of a specific embodiment of the invention.

BRIEF DESCRIPTION OF THE DRAWINGS

An embodiment of the invention is now described by way of example and with reference to the accompanying drawings in which like numerals are used to indicate like parts and in which:

FIG. 1 is a schematic diagram showing a circuit breaker coupled to a three phase electricity supply; an associated trip coil circuit; and an circuit breaker analysing device coupled to the trip coil circuit;

FIG. 2 is a schematic diagram showing a plurality of circuit breakers in parallel with a DC supply circuit;

DETAILED DESCRIPTION OF THE DRAWINGS

Figure 3:
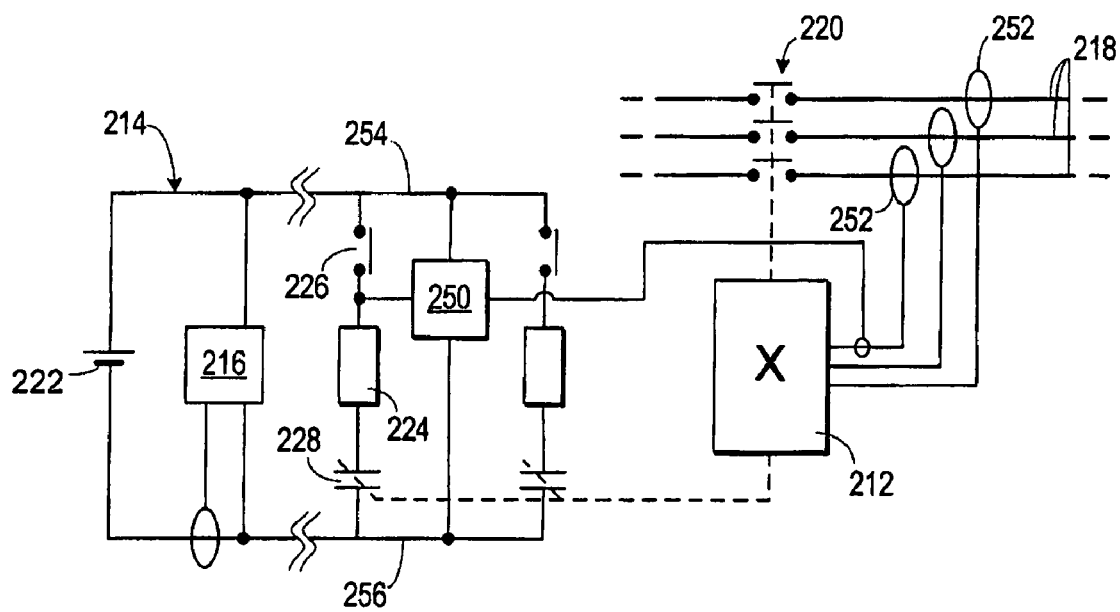
FIG. 3 is a schematic diagram showing a preferred control circuit incorporating an apparatus for detecting the operation of an associated trip coil embodying one aspect of the present invention.

Referring now to FIG. 1 of the drawings, there is shown, generally indicated as 10, an example of a system for detecting and analysing the operation of a circuit breaker 12. The system 10 comprises a control apparatus in the form of a trip coil circuit 14 and a circuit breaker analyzer 16. The analyser may, for example, comprise one of the PROFILE (trade mark) range of products supplied by Kelman Limited.

The circuit breaker 12 is shown, by way of example, coupled to three transmission or distribution lines 18 of a three phase voltage supply, although the invention is not limited to use with such. The circuit breaker 12 includes a switch or breaking mechanism (not shown) arranged to make (close) or break (open) a respective contact, or interrupter 20, in each supply line 18 depending on whether or not a fault is detected. The circuit breaker 12 may take any conventional form, for example oil-insulated, gas-insulated or vacuum switch, or size.

The trip coil circuit 14, which may also be referred to as a circuit breaker control apparatus or circuit, includes an electrical power supply, typically a DC voltage supply in the form of, for example, one or more batteries 22 (only one battery shown in FIG. 1). Typically, the supplied voltage is in the region of 30 to 200 volts. A trip coil 24 is provided between the positive (+ve) and negative (−ve) terminals of the battery 22. A trip switch 26 is provided in series with the trip coil 24, typically between the positive battery terminal and the trip coil 24. Normally, a trip coil auxiliary switch 28 is also provided in series with the trip coil 24, usually between the negative terminal of the battery 22 and the trip coil 24.

A close coil 30 is usually provided between the positive and negative terminals of the battery 22 in parallel with the trip coil 24. A close switch 32 is provided in series with the close coil 30, typically between the positive battery terminal and the close coil 30. Normally, a close coil auxiliary switch 34 is also provided in series with the close coil 30, usually between the negative terminal of the battery 22 and the close coil 30.

The trip coil 24, trip switch 26, auxiliary trip coil switch 28, close coil 30, close coil switch 32 and auxiliary close coil switch 34 may be said to comprise activation circuitry for the circuit breaker 12 in that they cause the circuit breaker 12 to open and close during use. The activation circuitry may vary from embodiment to embodiment and is not limited to the components and configuration described herein.

When a fault condition does not exist, the main contacts 20 adopt a closed state while the trip switch 26 and the close switch 32 each adopt an open state. The respective auxiliary switches 28, 34 each adopt a closed state.

When a fault occurs, for example overcurrent detected in the supply lines 18, the trip switch 26 is actuated to a closed state, typically under the action of a relay (not shown). Alternatively, the trip switch 26 may be closed manually, for example for testing purposes. Upon closure of the trip switch 26, the trip coil 24 is energised by current flowing from the battery 22. Energisation of the trip coil 24 causes an actuator (not shown), which is typically located inside of the trip coil 24, to activate the main breaking mechanism of the circuit breaker 12 thereby opening the contacts 20.

After the main contacts 20 are opened, the trip coil auxiliary switch 28 is closed. To this end, the trip coil auxiliary switch 28 may be mechanically linked to the main breaking mechanism of the circuit breaker 12 as indicated by broken line 29 in FIG. 1. Once the trip coil auxiliary switch 28 is opened, current to the trip coil 24 is cut off and the trip coil 24 de-energises.

The operation of the close coil auxiliary switch 34 is interlinked with the operation of the trip coil auxiliary switch 28 (the two switches 28, 34 may conveniently be mechanically inter-linked as indicated by broken line 29) such that when one of the switches 28, 34 is open, the other switch 34, 28 is closed and vice versa. Hence, when the trip coil auxiliary switch 28 is opened, the close coil auxiliary switch 34 is closed thereby allowing the close coil 30 to be energised upon closure of the close switch 32. The close switch 32 may be closed automatically once the fault is cleared or it may be closed manually. Closure of the close switch 32 causes the close coil 30 to be energised which, in turn, causes the breaker mechanism of the circuit breaker 12 to close the contacts 20.

The analyser 16 is electrically coupled to the trip coil circuit 14 in order to measure the current flowing in the trip coil 24 (and in the close coil 30, as applicable). To this end, a current transformer 36, in this example a DC current transformer comprising for example a Hall effect probe, or other conventional current measuring device, couples the analyser 16 to the trip coil circuit 14. It is preferred also to monitor the battery voltage and so the analyser 16 is electrically connected across the battery terminals, as shown in FIG. 1.

During use, the analyser 16 monitors, in particular, the current flowing in the trip coil 14, from which it is possible to analyse the performance of the circuit breaker 12.

The analyser 16 may be permanently installed or may be a portable detachable device. In either case, it is usually considered to be cost prohibitive to provide a separate respective analyser 16 for each circuit breaker at a given site. Moreover, permanent analysers can be expensive and difficult to install.

In order to reduce costs and complexity, it is common to associate a plurality of circuit breakers with a single control circuit, or trip coil circuit. This is illustrated in FIG. 2 which shows a trip coil circuit 114 which is generally similar to the trip coil circuit 14 except that it comprises respective activation circuitry for a plurality of circuit breakers 112 all supplied by a common electrical power supply in the form of battery 122. The respective circuitry (not shown) for each circuit breaker, including the respective trip coil and trip switch, are each provided in parallel with the battery 122. Although FIG. 2 itself shows, for reasons of illustration, the circuit breakers 112 in parallel with the battery 122, it is in fact the respective associated activation circuitry (as described in connection with FIG. 1) which is included in the circuit 114, the respective circuitry being, in turn, associated with a respective circuit breaker 12 in the manner described above.

A single analyser 116 is coupled to the trip coil circuit 114 for monitoring at least the trip coil current of the respective trip coil associated with each circuit breaker 112. Typically, the battery 122 and the analyser 116 are located at a remote monitoring station (not shown) while the circuit breakers 112 and their respective associated circuitry, including trip coil, are located elsewhere on a given site. The analyser 116 therefore monitors the trip coil current at an electrical point common to all the circuit breakers, conveniently at the battery 122 itself.

A problem with the arrangement illustrated in FIG. 2 is that when the analyser 116 is monitoring the trip coil current at said common electrical point, it needs to know which circuit breaker(s) 112 has activated.

This problem is addressed by an apparatus 250 for detecting operation of a circuit breaker, embodying one aspect of the invention, as is now described with reference to FIG. 3. FIG. 3 shows part of a control circuit in the form of a trip coil circuit 214 including an electrical, typically DC, power supply in the form of battery 222, trip coil 224, trip coil switch 226 and auxiliary trip coil switch 228, and a circuit breaker 212 associated with trip coil 224 in the general manner described above. The trip coil circuit 224 is of the general type illustrated in FIG. 2 wherein the activation circuitry of a plurality of circuit breakers 212 are incorporated into a common circuit using a common power supply. Only one circuit breaker 212, and associated circuitry, is shown in FIG. 3 for reasons of clarity. In the preferred embodiment, a respective detection apparatus 250 is associated with the respective activation circuitry of each circuit breaker 212.

In the preferred embodiment, the apparatus 250 is electrically connected, or coupled (as is convenient), to the trip coil circuit 214 so that it may detect when the trip coil 224 is energised. This may be achieved in any suitable manner—for example, by monitoring the voltage, or simply detecting the presence of a voltage, between the trip coil switch 226 and the trip coil 224 as shown in FIG. 3.

The apparatus 250 is preferably also connected or coupled to at least one of the supply lines 218 in order to determine whether or not the circuit breaker 212 has interrupted live supply lines 218. This too may be achieved in any suitable manner. In one embodiment, the apparatus 250 is electrically coupled to at least one of the supply lines 218 in order to measure current in the supply lines 18 particularly when the circuit breaker 212 operates. This may be achieved using current levels detected by one or more current transformers 252, or equivalent current detectors, coupled to one or more of the supply lines 218. Such current transformers are commonly provided in association with circuit breakers and may conveniently be used for this purpose.

The apparatus 250 is also electrically connected or coupled to the electrical supply lines 254, 256 (corresponding respectively in the present example to the positive and negative terminals of battery 222) of the trip coil circuit 214. This allows the apparatus 250 to add an electrical signal or signature component onto the electrical supply in order to indicate that its associated circuit breaker 212 has operated. Advantageously, the signature component uniquely identifies the associated circuit breaker 212. As may best be seen from FIG. 2, the DC supply lines 254, 256, and therefore the DC supply voltage provided by the battery 222, are common to all circuit breakers 112, 212 (and more particularly to their respective associated activation circuitry 114, 214) associated with the trip coil circuit 114, 214. In the preferred embodiment, each circuit breaker 112, 212 is associated with a respective apparatus 250, and each apparatus 250 is arranged to add a respective signature component to the electrical supply common to all circuit breakers 212. Any signature component added to the electrical supply on supply lines 254, 256 is detectable by a single analyser 216 connected to, and/or coupled to, the supply lines 254, 256 for detecting variations in voltage and/or current.

Each signature component conveniently comprises an electrical signal. In one embodiment, the apparatus 250 is arranged to add a signature component in the form of one or more voltage signals or components to the electrical supply voltage. To this end, the apparatus 250 may include a pulse transformer (not shown) or other suitable means for adding, or inserting, voltage signals, or pulses, to the supply voltage.

Figure 4:
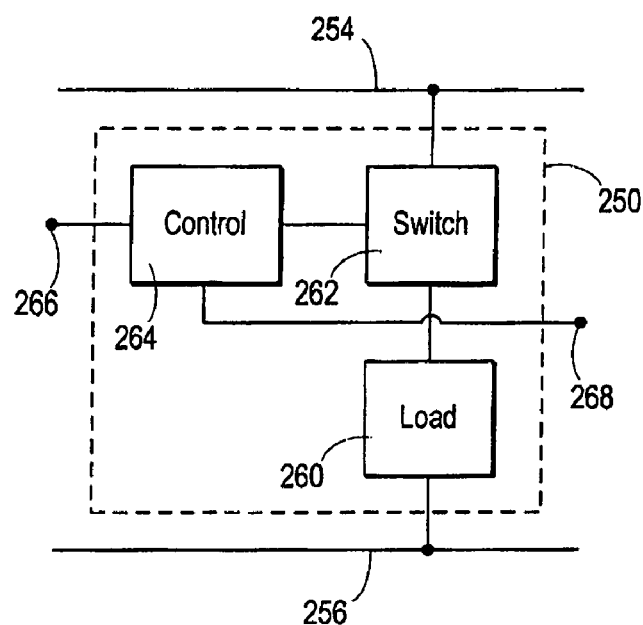
FIG. 4 is a schematic diagram illustrating one embodiment of the detecting apparatus.

In an alternative embodiment, the apparatus 250 may add a signature component in the form of a current signal, for example variations in the supply current on supply lines 254, 256. To this end, the apparatus 250 may include an electrical load which is selectably coupled, or connected, to the electrical supply via a switch. FIG. 4 shows an example of suitable circuitry for the apparatus 250.

The apparatus 250 includes an electrical load 260, for example one or more resistors (not shown), selectably connectable to supply lines 254, 256 via a switch 262, for example a transistor (not shown). The switch 262 is activatable between an open state, in which the load 260 is not connected to the supply lines 254, 256, and a closed state in which the load 260 is connected to the supply lines 254, 256. When the switch 260 is closed, the load 260 draws current from the electrical power supply via supply lines 254, 256 thereby causing a variation in the supply current on lines 254, 256. The operation of the switch is controlled by a control unit 264 which may take any suitable form, for example a suitable programmed microprocessor, microcontroller, or a logic circuit. The control unit 264 has a first input 268 for receiving a signal from which it may be determined whether or not the respective circuit breaker 212 has activated to break the supply lines 218, and a second input 266 for receiving a signal from which it may be determined whether or not the respective trip coil switch 226 is closed. The control unit 264 causes a respective signature component to be added to the electrical supply by opening and closing the switch 262 one or more times. Preferably, the control unit 264 is programmable so that the manner in which it opens and closes the switch 262 may be altered to suit the application.

Figure 5:
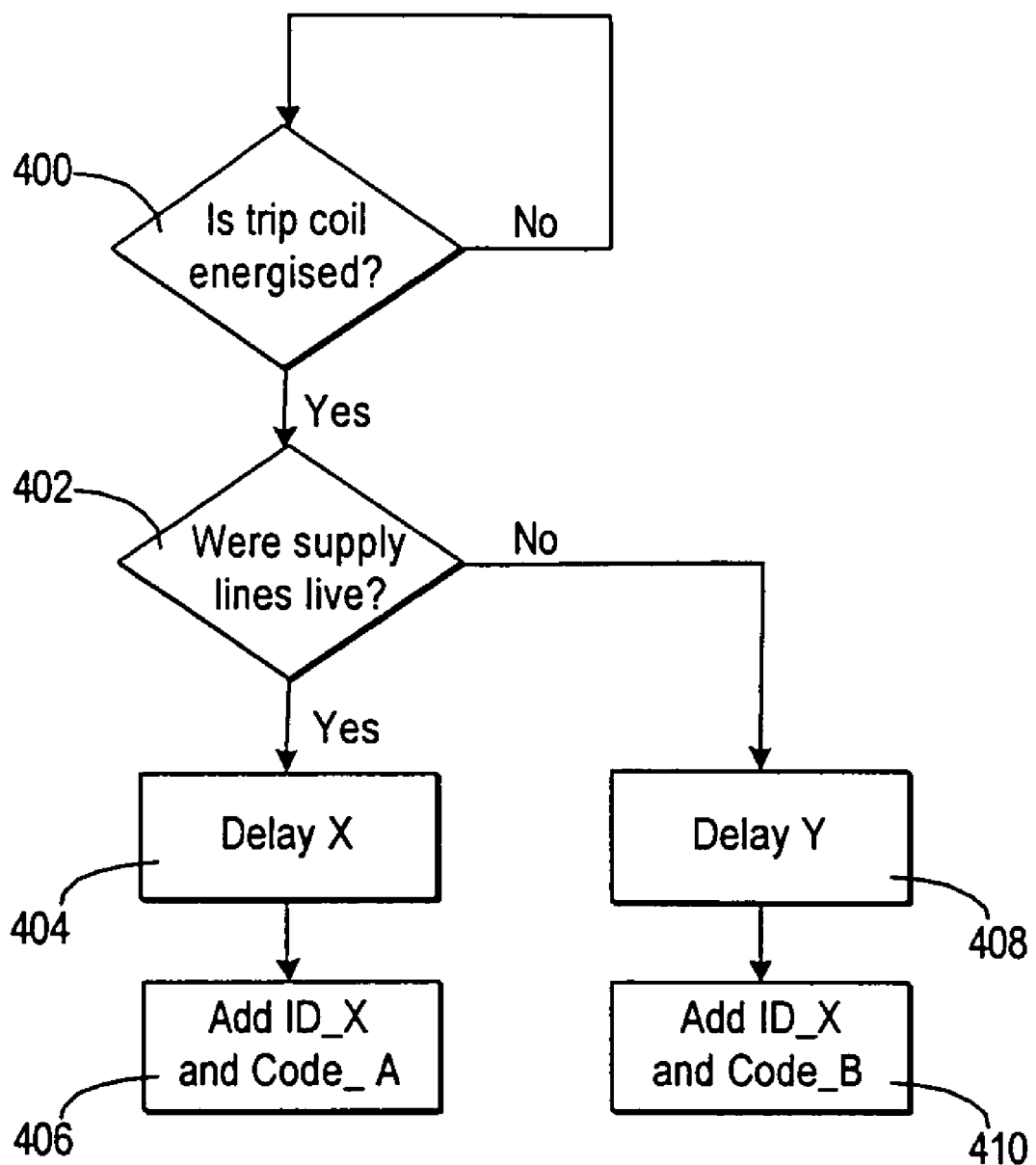
FIG. 5 is a flowchart illustrating one example of the operation of the detecting apparatus shown in FIG. 3.

FIG. 5 illustrates, by way of example, how the apparatus 250 may operate. At operation 400, the apparatus 250 checks whether or not its associated circuit breaker 212 has activated. In the present example this is achieved by checking whether or not the respective trip coil 224 has been energised by, for example, checking for the presence of a voltage between the trip coil switch 226 and trip coil 224. In the circuit of FIG. 3, this is a valid checking method only if it is assumed that the auxiliary trip coil switch 228 is closed during this operation. Other methods, for example current detection in or at either side of the trip coil 224 may alternatively be employed. Alternatively still, the apparatus 250 may be arranged to detect operation of the circuit breaker 212 from an electrical signal derived from the mechanical operation of the circuit breaker 212 itself.

If it is determined that the circuit breaker 212 has not operated, then operation 400 is repeated. If it is determined that the circuit breaker 212 has operated, i.e. that the trip coil 224 is energised, then the apparatus 250 checks, at operation 402, whether or not the main supply lines 218 were live, i.e. carrying current, when the circuit breaker 212 operated. This may be achieved using one or more current transformer 252 as described above. If the main supply lines 218 are live, it is preferred not to progress to the next operation until the circuit breaker 212 has interrupted the lines 218. This ensures that any subsequent actions of the apparatus 250 do not interfere with the trip coil current measurements, and any other measurements, which may be made by the analyser 216 during the operation of the circuit breaker 212. By way of example, if, at operation 402, the apparatus 250 determines that the main supply lines 218 are carrying current, then the apparatus 250 preferably continues to monitor the main supply lines 218 until the current drops to zero (indicating that the circuit breaker 212 has operated) before proceeding to operation 404. This may alternatively be performed in any other convenient manner—for example waiting a pre-determined time, typically in the order of several hundred milliseconds, to allow the circuit breaker 212 to operate.

In operation 404, the apparatus 250 creates a delay X, the length of which is specific to the associated circuit breaker 212. Hence, the value of delay X, which may be zero, is different for each circuit breaker 212 associated with the common trip coil circuit 214. In the preferred embodiment, the delay X is calculated from when the apparatus 250 determines that the contacts 220 in the main supply lines 218 are opened and this may be determined by the instant at which the detected current in the main lines 218 falls to zero.

In operation 406, the apparatus 250 adds a signature component, ID_X, onto the DC supply lines 254, 256, the signature component being specific to the respective circuit breaker 212. This may involve adding one or more voltage pulses to the DC supply voltage provided by the battery 222 or causing current variations, as described above. The voltage pulses or current variations may, for example, embody a binary code which uniquely identifies the respective circuit breaker 212. By way of example, for a 30 volt DC power supply, the apparatus 250 may be arranged to add voltage pulses of about 5 volts amplitude.

It is preferred that the apparatus 250 also adds a status code component, Code_A, which may also comprise one or more voltage pulses, to the DC supply voltage to indicate that the present operation of the respective circuit breaker 212 has interrupted live main supply lines 218, i.e. that a genuine fault has occurred and been isolated.

At operation 402, if it is determined that the supply lines 218 were not live (e.g. no current detected at operation 402), then the apparatus 250 creates a delay, Delay Y (operation 408) before, at operation 410, adding signature component ID_X to the DC supply lines 254, 256 as described above, and adding a different status code component, Code_B, indicating that the main supply lines 218 were not live when the circuit breaker 212 operated (i.e. that the present operation of the circuit breaker 212 was most probably the result of a test rather than a reaction to a genuine fault). Delay Y advantageously comprises the delay X plus an additional component corresponding to the time taken for the circuit breaker 212 to operate, with the result that the signature component ID_X and status code Code_B are added to the DC supply line 254, 256 at substantially the same time as they would otherwise have been during operation 406.

Hence, when one or more circuit breakers 212 are activated, the analyser 216 may first monitor the trip coil current and/or DC supply voltage during the operation of the circuit breaker(s) as normal. Then, after the circuit breaker(s) 212 have operated, the analyser 16 may detect the, or each, corresponding signature component from the DC supply lines 254, 256, so that it may determine which of the circuit breaker(s) 212 has activated. Because the respective signature components are time-spaced as a result of the different values of delay X, the signature components do not interfere with one another and may be individually detected by the analyser 216.

It will be understood that the signature components may take any suitable form so long as the analyser may differentiate amongst them. For example, each signature component may comprise one or more pulses and be differentiatable from the others only by the time-spacing between pulses or by the time at which the, or each, pulse is added to the DC supply line 254, 256.

In alternative embodiments, the control circuit 214 may have an AC supply.

The invention is not limited to the embodiments described herein which may be modified or varied without departing from the scope of the invention.

The invention claimed is:

1. A control apparatus for a plurality of devices, the control apparatus including
    respective activation means for activating each of said devices;
    an electrical power supply arranged to generate an electrical power supply signal for supplying electrical power,
    wherein each of said activation means is connected to said electrical power supply and arranged to derive electrical power from said electrical power supply signal;
    means for detecting operation of each device;
    and means for incorporating signature components into said electrical power supply signal,
    wherein said detecting means is cooperable with said incorporating means to cause, upon detection by said detecting means that a respective one of said devices has operated, said incorporating means to incorporate a signature component into said electrical power supply signal, said signature component identifying said respective one device,
    and wherein said signature component incorporating means is arranged to incorporate said signature component into said electrical power signal after a respective time delay has elapsed after the operation of said respective one device has been detected, said respective time delay being initiated by the detection of the operation of said respective one device by the detecting means, and having a length that is different for each of said devices to the extent that, in the event that two or more of said devices operate simultaneously, respective signature components do not interfere with one another.

2. A control apparatus as claimed in claim 1, wherein in respect of each of said devices, respective detection means and respective incorporating means are provided.

3. A control apparatus as claimed in claim 1, wherein said signature component comprises an electrical signal.

4. A control apparatus as claimed in claim 3, wherein said signature component comprises a voltage signal.

5. A control apparatus as claimed in claim 3, wherein said signature component comprises a current signal.

6. A control apparatus as claimed in claim 3, wherein, in respect of each of said devices, the respective signature component embodies a respective binary code.

7. A control apparatus as claimed in claim 1, wherein said detection means comprises a detection apparatus and the activation means comprises activation circuitry, the detection apparatus being associated with the activation circuitry and arranged to detect operation of the respective device by monitoring one or more electrical signals in the activation circuitry.

8. A control apparatus as claimed in claim 7, wherein the activation circuitry includes a respective trip coil for each of said devices, and the detection apparatus is arranged to determine that the respective device has operated when the respective trip coil is activated.

9. A control apparatus as claimed in claim 1, wherein said incorporating means includes a pulse transformer arranged to add one or more voltage pulses to the supply voltage.

10. A control apparatus as claimed in claim 1, wherein the incorporating means includes a load selectably coupled to the electrical power supply by means of a switching device.

11. A control apparatus as claimed in claim 1, wherein each device comprises a circuit breaker.

12. A control apparatus as claimed in claim 1, wherein the electrical power supply signal comprises a DC electrical power signal.

13. A control apparatus as claimed in claim 11, wherein each circuit breaker is arranged to interrupt one or more electrical supply lines when activated, the detecting means being arranged to monitor electrical current carried by said electrical supply lines, and to cause a respective status code component which identifies whether or not said electrical supply lines are live when the circuit breaker is activated to be incorporated into said electrical power supply signal.

14. A detection apparatus for use with means for activating a respective one of a plurality of devices, said activation means being connected to an electrical power supply and arranged to derive electrical power from an electrical power supply signal provided in use by said electrical power supply, the detection apparatus including:
  means for detecting operation of said respective device;
  and means for incorporating a signature component into said electrical power supply signal,
    wherein said detecting means is cooperable with said incorporating means to cause, upon detection by said detecting means that said respective one device has operated, said signature component into said electrical power supply signal, said signature component identifying said respective one device,
    and wherein said signature component incorporating means is arranged to incorporate said signature component into said electrical power signal after a time delay has elapsed after the operation of said respective one device has been detected, said time delay being initiated by the detection of the operation of said respective one device by the detecting means, and having a length that is uniquely associated with said respective one device with respect to said plurality of devices to the extent that, in the event that two or more of said devices operate simultaneously, respective signature components do not interfere with one another.

15. A system for monitoring operation of a plurality of circuit breakers, the system comprising a control apparatus, the control apparatus including respective means for activating each circuit breaker; an electrical power supply arranged to generate an electrical power supply signal for supplying power to said control apparatus, wherein each of said activation means is connected to said electrical power supply and arranged to derive electrical power from said electrical power supply signal; means for detecting operation of each circuit breaker; and means for incorporating signature components into said electrical power supply signal, wherein said detecting means is cooperable with said incorporating means to cause, upon detection by said detecting means that a respective one of said circuit breakers has operated, said incorporating means to incorporate a signature component into said electrical power supply signal, said signature component identifying said respective one circuit breaker, and a circuit breaker analyser electrically coupled to the control apparatus, the circuit breaker analyser being arranged to detect said signature component in said electrical power supply signal, and wherein said signature component incorporating means is arranged to incorporate said signature component into said electrical power signal after a respective time delay has elapsed after the operation of said respective one circuit breaker has been detected, said respective time delay being initiated by the detection of the operation of said respective one circuit breaker by the detecting means, and having a length that is different for each of said circuit breakers to the extent that, in the event that two or more of said devices operate simultaneously, respective signature components do not interfere with one another.

16. A method of signalling device operation in an apparatus comprising respective activation means for activating a respective one of a plurality of devices, each of said activation means being connected to an electrical power supply and arranged to derive electrical power from an electrical power supply signal provided in use by said electrical power supply, the apparatus further including means for detecting operation of each device; and means for incorporating a signature component into said electrical power supply signal, said method comprising: causing, upon detection by said detecting means that a respective one of said devices has operated, said incorporating means to incorporate a signature component into said electrical power supply signal after a respective time delay has elapsed after the operation of said respective one device has been detected, said signature component identifying said respective one device; initiating said respective time delay by the detection of the operation of said respective one device by the respective detecting means: and causing said respective time delay to have a length that is different for each of said devices to the extent that, in the event that two or more of said devices operate simultaneously, respective signature components do not interfere with one another.

17. An activation apparatus for a respective one of a plurality of devices, the activation apparatus including
  activation means for activating said respective one device;
  means for receiving an electrical power supply signal for supplying electrical power to said activation apparatus,
  means for detecting operation of said respective one device;
  and means for incorporating a signature component into said electrical power supply signal,
    wherein said detecting means is cooperable with said incorporating means to cause, upon detection by said detecting means that said respective one device has operated, said incorporating means to incorporate said signature component into said electrical power supply signal, said signature component identifying said respective one device,
    and wherein said signature component incorporating means is arranged to incorporate said signature component into said electrical power signal after a time delay has elapsed after the operation of said respective one device has been detected, said time delay being initiated by the detection of the operation of said respective one device by the detecting means, and having a length that is uniquely associated with said respective one device with respect to said plurality of devices to the extent that, in the event that two or more of said devices operate simultaneously, respective signature components do not interfere with one another.

18. An activation apparatus as claimed in claim 17, wherein said detection means comprises a detection apparatus and the activation means comprises activation circuitry, the detection apparatus being associated with the activation circuitry and arranged to detect operation of the respective device by monitoring one or more electrical signals in the activation circuitry.

19. An activation apparatus as claimed in claim 17, wherein the activation circuitry includes a respective trip coil for each of said devices, and the detection apparatus is arranged to determine that the respective device has operated when the respective trip coil is activated.

* * * * *